Patented Sept. 27, 1938

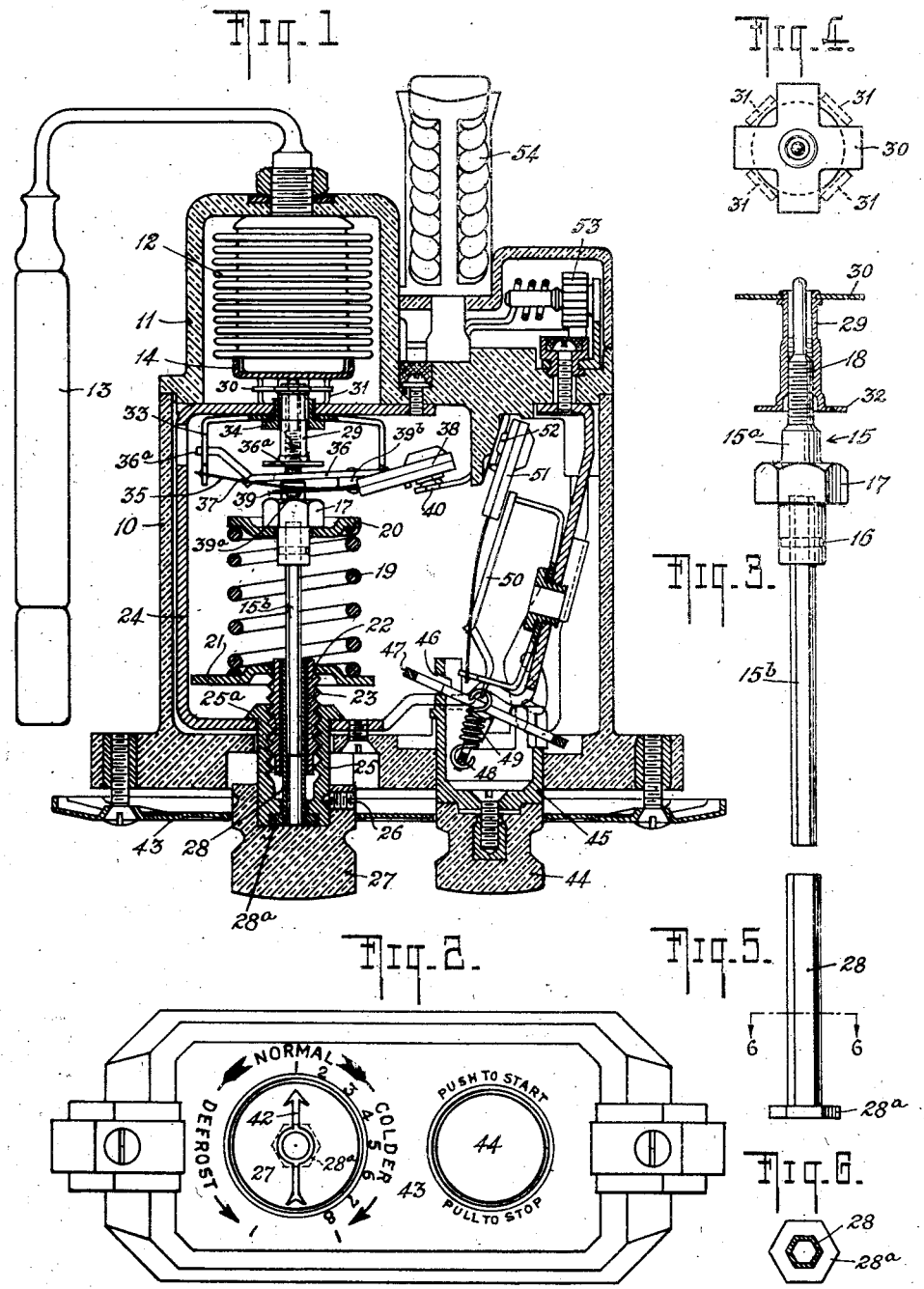

2,131,161

UNITED STATES PATENT OFFICE 2,131,161

ADJUSTABLE CONTROL FOR REFRIGERATORS

Frank J. Bast, Queens Village, N. Y., assignor to Charles J. Tagliabue Mfg. Co., Brooklyn, N. Y., a corporation of New York Application November 21, 1933, Serial No. 698,967

14 Claims. (Cl. 200—83)

The present invention relates to mechanism for adjustably controlling the temperatures automatically maintained within a refrigerator or similar apparatus.

The object of the present invention is to provide an adjustable controller wherein the temperature differential may be regulated simultaneously with a change in the range of temperatures maintained by the controller in order to maintain certain predetermined conditions in all adjustments of the controller.

The present invention relates in particular to that type of controller which has a range from a minimum cold temperature to a maximum defrosting temperature, the controller automatically maintaining any selected temperature range within this temperature interval.

Adjustable controllers of various kinds for refrigerators are known whereby, upon the operation of a knob or equivalent device, the selected upper and lower control point temperatures maintained within the refrigerator or within the expansion coils may be adjusted to a higher or lower temperature range. However, in vapor pressure-operated control systems, such operation of the knob causes variation of the temperature interval or differential between the upper and lower control point temperatures, and generally in an undesirable manner. Thus, where an adjustable, vapor pressure-operated controller is designed to effect control operations such as the opening and closing of a motor switch, at temperatures of 15° F. and 25° F., respectively, in the expansion coils, operation of the control knob in one direction may change the control points to, for example, 0° F. and 13° F. respectively, or, in the other direction, to 28° F. and 35° F., respectively. It will thus be seen that in this case, as the temperature range rises, the differential falls. This will be clear when it is considered that the vapor pressure-temperature curves of the various vapors and liquids employed in the bulb of a vapor pressure operated controller, such as propane, sulfur-dioxide, methyl chloride, butane, etc., are not straight lines, that is, the vapor pressure is not directly proportional to the temperature, and hence is not a straight line function of the temperature, for any considerable range of temperatures. Thus in the case of methyl chloride, the vapor pressure is 5 lbs. at 0° F., and 10 lbs. at 10° F., that is, it rises one pound for each 2° F., while at 40° F. it is 29 lbs. and at 50° F. it is 39 lbs., so that at this higher temperature range the vapor pressure rises 1 lb. for each 1° F. It should thus be evident that as the operation of these controllers depends upon the pressure developed in the vapor system, the controller will cause irregular operation of the refrigerator, if only the temperature range is adjusted. Thus if a controller is set to operate at 0° and 10° F., there is an increase of pressure, in the case of methyl chloride, of 5 lbs. developed in the system between these control temperature points, and the operation of, for example, a switch controlled by the controller, will be determined by this pressure differential. However, if it is desired to alter the setting to, for example, a range beginning at 40° F., the upper temperature limit will be 45° F. instead of 50° F. for the same pressure differential. In other words, the higher the temperature range, the closer together will be the control temperatures for the same vapor pressure differential. This means that at the defrosting range, the cycle will be shorter than at the lower ranges, and that, in the case of an electric refrigerator, the motor will run for shorter periods during defrosting than when the controller is set for lower temperatures, particularly as more work is required to reduce the temperature of the refrigerant by one degree at a lower temperature than at a higher range. It is, however, desirable that the cold period of a defrosting cycle be increased rather than decreased, so as to maintain the refrigerator compartment at a food-preserving temperature even during defrosting, or at least that it be kept substantially constant throughout the range of adjustment, as it is desirable also that the motor running time be made as uniform as possible for all cycles regardless of the controller setting range.

The improved device according to the present invention provides a construction in which a change in the range setting of the controller is accompanied automatically by an adjustment which effects a suitable change in the differential between the upper and lower temperature control points over that which would normally occur at the new range, in other words, an automatic and predetermined change is effected in the pressure differential in the vapor system required to effect operation of, for example, a switch or valve in opposite directions at the new range. The construction and arrangement in the preferred embodiment of the invention are such that as the temperature range is raised by suitable setting of the controller, the interval or differential between the switch or valve operating pressures is increased. Conversely as the range is lowered, the degree of movement of the sensitive member required to effect opening and closing of the switch or valve will be reduced, so that the temperature differential will remain more nearly constant throughout the whole interval of range adjustment, or will have any desired value at the different ranges, for example, a progressive increase in the temperature differential from the lowest to the highest range.

The present invention accordingly provides a controller mechanism which at the low temperature range is capable of establishing a short degree differential setting, such as 3° F. to 13° F. for the quick freezing setting, a higher differential for the normal setting, say 12° to 28°, and a still higher differential for the defrosting setting, say 20° to 38° at the expansion coils. Thus in the defrosting setting the motor or burner of the refrigerator is set into operation when a temperature of 38° is reached in the expansion coils, while the motor or burner is cut out when the temperature falls to 20° F. Hence, for a given temperature differential at the quick freezing setting, a lower control point, that is, a lower low temperature point for the defrosting setting or cycle is obtained with my improved mechanism as compared with known control devices, the mechanism according to the invention providing longer cold periods or intervals during the defrosting, or at least cold periods equal in length to those at lower temperature ranges, so that should the housewife or other attendant neglect to restore the normal setting of the controller after the defrosting is complete, the temperature within the refrigerator will nevertheless be maintained on the average low enough to preserve the food stored therein.

The invention will be further described with the aid of the accompanying drawing, wherein Fig. 1 is a horizontal section through the controller; Fig. 2 represents an elevation showing the operating knob and associated dial; Fig. 3 is an enlarged view of the differential adjusting mechanism; Fig. 4 is an end view of Fig. 3; Fig. 5 shows a detail; and Fig. 6 is a section along the plane 6—6 of Fig. 5.

The controller comprises a casing 10 made of a molding composition or other suitable material, preferably of insulating character, and housing the major portion of the controller mechanism. Attached to the casing 10 is a housing 11 of similar material within which is located the expansible bellows 12 of a vapor system whose bulb 13 is adapted to be clamped against the expansion coils of the refrigerator or placed within any other space whose temperature is to be controlled. The bellows is provided with a bearing plate 14 which is engaged by the rounded end of a rod 15 composed of the sections 15a and 15b (Fig. 3) which are fixed to each other by means of a pin 16. The rod section 15a is provided with a nut or similar abutment member 17, which is fixed thereon, and with an intermediate threaded section 18 whose function will be explained hereinbelow.

The rod 15 is urged into engagement with the bearing plate 14 of the bellows 12 by means of a spring 19 bearing against a plate 20 which rests against the abutment 17, the other end of the spring engaging a non-circular plate 21 provided with an opening 22 which receives the end of an externally threaded screw 23. The casing 10 is lined by a frame 24 which is positioned to be engaged by the angular periphery of plate 21 and thus prevent rotation of the latter. The screw is received within an internally threaded nut 25 fixed, as by means of a set screw 26, to the operating knob 27 which extends externally of the casing 10. As shown in Fig. 1, the nut 25 is provided with an enlarged head 25a which bears against the inside face of the frame 24, the body of the nut passing through registering openings in such frame and in the casing 10.

The rod section 15b is of angular or non-circular cross-section, for example, hexagonal, and is received within a correspondingly shaped tube 28 having an angular head 28a positioned within a correspondingly shaped recess in the end portion of the nut 25, so that rotation of the latter will cause rotation of the sleeve 28 and hence of the rod 15. Upon the threaded portion 18 of the rod 15 is mounted an internally threaded sleeve nut 29 which is provided with a cross-shaped member 30 fixed thereto and engaging between a number of fingers 31 struck from the body of plate 14, the sleeve 29 being thereby held against rotation and being limited to axial movement upon rotation of the rod 15. The other end of the sleeve 29 is provided with a flange 32, or equivalent element, for operating the mechanism which controls the energy-supplying fluid of the refrigerator as will be described below.

The screw 23 has a right-hand thread, so that upon rotation of knob 27 in a clockwise direction, the screw will move downwardly, and vice versa. The threaded portion 18 is likewise right handed, and clockwise rotation thereof will therefore cause the sleeve nut 29 to move downwardly and vice versa, since the rod 15 is held against axial movement, during this adjustment, by the bellows 14 in one direction and by the spring 19 in the other.

The flange 32 and abutment 17 may serve to operate a suitable device for controlling the circuit of the energy-supplying fluid of the refrigerator or similar apparatus. Thus, in the case of an electrically operated refrigerator, the member 32 may be made, in cooperation with the abutment 17, to operate an electric switch of any suitable kind. A suitable form of switch is shown by way of example in the drawing, such switch being of the toggle type, and comprising spring support members 33 which are clamped to the frame 24 by means of a nut 34. The vertical arms of the supports 33 have a knife edge engagement with the two toggle members 35 and 36 which engage each other along a knife edge at 37. The toggle member 36 is provided with an enlarged aperture through which passes the rod 15 and is provided with rounded button or knob members 36a, one on each side of the rod, for engagement with the flange 32. The toggle member 35 is in the form of a spring plate, and the toggle mechanism is arranged to operate an insulated jumper or bridge element 38, such element being mounted upon the free end of the flexible member 35. The member 35 is suitably apertured or forked to clear the other parts of the mechanism, and is attached to the jumper 38 in any desired manner. The jumper 38 cooperates with a pair of electric contacts 40 suitably arranged in the circuit of the motor (not shown) which operates the compressor of the refrigerator.

The toggle mechanism is moved upwardly by the engagement of the abutment 17 with the knobs 39a on the furcations of a forked spring member 39 fixed at its opposite end upon a block 39b on the toggle member 36. The member 39 becomes flexed as the rod 15 moves upwardly and as the neutral position of the toggle is approached or reached, the energy stored in the flexed spring member 39 aids the resiliency of the supports 33 in rapidly throwing the switch 38 to the reverse position, thereby reducing or eliminating arcing at the contacts 40. The toggle member 36 is provided with an extension 36a engaging within an aperture in the left support 33 and operating as a stop to limit the movement of the toggle in both directions.

The knob 27 is provided with a pointer 42 which cooperates with a dial plate 43 bearing suitable indicia thereon, the mechanism illustrated being one in which continuous control may be had from a minimum cold temperature to a maximum defrosting temperature. These indicia may include the words "Colder", "Normal" and "Defrost" or words of equivalent meaning.

The mechanism so far described operates as follows: As is well understood in the art, the bellows 12 expand and contract in the normal operation of the mechanism as the temperature at the place under control rises and falls. This movement of the bellows is communicated by the rod 15 and sleeve nut 29 to the toggle, the expansion of the bellows occurring against the resistance of the spring 19, and the rod 15, and hence the toggle mechanism, being caused to follow the contractile movements of the bellows by such spring. As soon as the movement of the toggle mechanism exceeds a predetermined amount in one direction, such as to carry it to or slightly beyond its neutral position, the mechanism snaps quickly into its other position, thereby quickly opening or closing the switch 38.

The distance between the flange 32 and the abutment 17 determines the differential of the pressures or temperatures at the control points, that is, when the switch is operated to open and close the circuit. According to this invention, upon operation of the knob 27 to vary the range of the temperatures at which the toggle mechanism is operated to make and break the contact at the switch 38, by increase or decrease in the tension of the spring 19, the temperature differential will be simultaneously altered in the following manner: Rotation of the knob will cause simultaneous rotation of the nut 25. As the latter, however, is held against longitudinal movement by the resistance of spring 19 and by the head 25a, the screw 23 will be caused to move axially of the rod 15. This movement of the screw 23 will therefore vary the pressure of the spring 19 and will accordingly vary both the circuit opening and circuit closing temperatures to an approximately equal extent. Rotation of nut 25 is accompanied by rotation of the rod 15 which results in a longitudinal movement of the sleeve nut 29. In this way the effective distance between the bellows 12 and the toggle member 36 is reduced or increased so as to increase or decrease, respectively, the temperature at which the switch will be closed to cause operation of the refrigerator motor. Thus, assuming that the controller is to be adjusted from a normal position to a defrosting position, the knob 27 will be rotated counter-clockwise. The thread of the screw 23 and of the portion 18 of rod 15 being right-handed, the screw 23 will move up, as viewed in Fig. 1, and so will the sleeve nut 15. Upward movement of screw 23 increases the tension of spring 19, and thereby tends to raise both the circuit opening and circuit closing temperatures. However, the accompanying upward movement of sleeve nut 29 at least in part neutralizes the rise in the circuit closing temperature setting, effected by increase in the tension of the spring 19, by increasing the gap between the parts 32 and 17. As a result, the temperature differential at the defrosting setting is increased over that at the normal or cold setting. Thus, the pitches of the various threads and the strength of the spring 19 may be so selected that the controller will have, for example, a cold setting of 3° and 13° F., a normal setting of 12° and 28° F., and a defrosting setting of 20° and 38° at the expansion coils, from which it will be observed that a relatively longer cold period per cycle is provided at the defrosting setting, insuring a sufficiently low temperature in the refrigerator compartment for the preservation of food even while the refrigerator is being defrosted.

The controller may be provided with any suitable mechanism for throwing the same permanently into or out of operation. The mechanism illustrated in the drawing comprises a push and pull knob 44 which is connected to a member 45 provided with an aperture 46 through which passes an oscillating member 47. The latter is provided with an extension 48 serving as an anchor for an overthrow spring 49 which is associated with a toggle mechanism 50 arranged to operate a switch 51 controlling a set of contacts 52 in series with the contacts 40. The control mechanism may also be provided with an overload switch 53 of any suitable construction arranged to control the toggle mechanism and hence the switch 51 to open the latter when an excessive current is fed to the motor. The controller may also be provided with a plug 54 to facilitate connection with the power line circuit. As these auxiliary devices form no part of the present invention it is not believed to be necessary to describe them in detail.

The frame 24 serves to reinforce the casing 10 and at the same time serves as a mounting for the several parts of the controller, the parts being assembled on the frame outside the casing and then inserted into the latter as a unit. It will be noted that in my improved controller above described the temperature or pressure differential determining mechanism is operable from the exterior of the casing 10.

While the invention has been described above as embodied in a controller for an electrically operated refrigerator, it will be evident that the mechanism above described can be designed to operate also a valve controlling the flow of gas to a gas-operated refrigerator. Also, the controller can readily be made to be responsive to fluctuations in the pressure in any selected portion of the refrigerant circuit instead of to changes in the temperature.

It will be evident that certain features of the invention may be used without others and that various changes in the design and arrangement of parts may be resorted to within the scope of the appended claims without departing from the spirit of the invention.

I claim:

1. In an automatic refrigerator, a controller for maintaining the temperature or pressure at a selected place within predetermined limits, means for adjusting the range of the temperature or pressures maintained by the controller, means providing a gap adjustable for increasing the differential of said temperatures or pressures as the range is raised and decreasing the differential as the range is lowered, said controller including a single snap-action governing means having a portion arranged to operate within the adjustable gap.

2. In an automatic refrigerator, a switch for controlling the energy supplying circuit of the refrigerator, temperature or pressure responsive mechanism including an expansible bellows arranged to cause opening or closing of said switch when the temperature or pressure reaches predetermined values, a spring opposing the movement of the bellows in one direction, adjustable means associated with said responsive mechanism for varying the range of the temperatures or pressures at which said switch is operated, a manually operable member for adjusting said means, and mechanism arranged to be adjusted simultaneously with the adjustment of said means upon operation of said member and acting to compensate approximately for variations in the rate of change of pressure with respect to temperature to keep the closed periods of the switch approximately constant over the different ranges.

3. In an automatic refrigerator, a controller for maintaining the temperature or pressure at a selected place within predetermined limits, comprising a temperature or pressure sensitive means, a spring arranged to oppose the expansion of said sensitive means, a pair of spaced abutment members arranged to be acted upon by said sensitive means and spring to be moved in the one or other direction, a switch device arranged to be actuated by one or the other of said abutments upon movement of the sensitive means beyond a predetermined distance in one or the other direction to open or close, respectively, the energy supplying circuit of the refrigerator, a manually operated member for varying the pressure of said spring, and means connected with said member for simultaneously altering the distance between said abutments.

4. In an automatic refrigerator, a controller for maintaining the temperature or pressure at a selected place within predetermined limits, comprising an expansible member adapted to expand and contract in response to fluctuations in the temperature or pressure at the selected place, a rod bearing against said member, a spring acting upon said rod to urge the latter into contact with said member so as to follow the expansion and contraction movements of the latter, a switch device associated with said rod, an abutment member upon said rod upon each side of said device and adapted to move the latter in one or the other direction in accordance with the movement of said expansible member, said abutments being adjustable relatively to each other, manually operable means for varying the pressure of said spring, and means connected with said manually operable means for simultaneously varying the distance between said abutments.

5. In an automatic refrigerator, a controller for maintaining the temperature or pressure at a selected place within predetermined limits, comprising a temperature or pressure sensitive means including an expansible bellows, a rod extending axially of said bellows, a spring coiled about said rod and acting thereupon to urge the same toward said bellows, whereby said rod is caused to follow the movements of said bellows, a switch device associated with said rod, a pair of spaced abutments upon said rod, one upon each side of said device, adapted to engage the latter to cause movement thereof in one or the other direction in accordance with the movement of the bellows, a manually operable member arranged at the end of the rod opposite the bellows in substantially axial alignment with the rod and bellows for varying the pressure of said spring to adjust the range of temperatures or pressures maintained by said controller, and mechanism connected with said manually operable means and operating simultaneously therewith to vary the distance between said abutments and thereby vary the temperature or pressure differential simultaneously with the adjustment of the range.

6. A controller as set forth in claim 5, wherein one of said abutments comprises a nut member threaded upon said rod, and means for holding said nut member against rotation, the manually operable means being rotatable and being coupled to said rod to rotate the same.

7. A controller as set forth in claim 5, wherein said manually operable member comprises a rotatable knob, a screw member arranged to be moved axially upon said rod upon operation of said knob, said screw member arranged to vary the tension of the spring, a connection between said rod and knob whereby rotation of said knob causes rotation of said rod independently of the axial movement of said rod, one of said abutments comprising a nut member threaded upon said rod, and means for holding said nut member against rotation, whereby rotation of said knob causes simultaneous adjustment of the distance between said abutments.

8. A controller as set forth in claim 5, wherein said switch comprises a snap switch adapted to effect rapid opening and closing of a circuit upon movement of the bellows in one or the other direction for a predetermined distance.

9. In an automatic refrigerator, a controller for maintaining the temperature or pressure at a selected place within predetermined limits, comprising a casing, temperature or pressure sensitive means within said casing responsive to changes in the temperature or pressure at the place under control, variably resilient means for selectively predetermining the range of the limits of temperature or pressure maintained by the controller, a switch device associated with said sensitive means to be operated thereby when the limiting temperatures or pressures are reached, mechanism associated with the switch and adjustable to vary the amplitude of movement of the sensitive means required to effect opening and closing of the switch and thus determining the differential of the temperatures or pressures at which the switch is opened and closed, and a manually operable member located externally of the casing and cooperatively associated with said mechanism to vary the differential of the limiting temperatures or pressures maintained by the controller.

10. In an automatic refrigerator, a controller for maintaining the temperature or pressure at a selected place within predetermined limits comprising a casing, temperature or pressure sensitive means associated with the casing and responsive to changes in the temperature or pressure at the place under control, variably resilient means for predetermining the range of the limits of temperature or pressure maintained by the controller, a switch device associated with said sensitive means to be operated thereby when the limiting temperatures or pressures are reached, differential determining mechanism supported on said frame and cooperatively associated with said sensitive means and switch to vary the differential of the limiting temperatures or pressures maintained by the controller, said differential determining mechanism including relatively adjustable abutment members engageable with the switch mechanism, and a finger-engageable member upon the outside of the casing for adjusting said differential determining mechanism.

11. In an automatic refrigerator, a controller for maintaining the temperature or pressure at a selected place within predetermined limits comprising a casing, temperature or pressure sensitive means associated with the casing and responsive to changes in the temperature or pressure at the place under control, variably resilient means for predetermining the range of the limits of temperature or pressure maintained by the controller, a switch device associated with said sensitive means to be operated thereby when the limiting temperatures or pressures are reached, a frame fixed within the casing and supporting the resilient means and switch device, mechanism cooperatively associated with said sensitive means and switch and acting to cause raising of the high point to a greater degree than the low point as the range is raised and thus varying the differential of the limiting temperatures or pressures maintained by the controller, and a finger-engageable member upon the outside of the casing for adjusting said differential determining mechanism, the latter including a rod member and a bushing supported by the frame, said bushing being threaded on said rod member, the latter being engaged by the finger-engageable member to be rotated thereby on rotation of such member but being free to move axially with respect thereto.

12. In an automatic refrigerator, a temperature controller comprising a casing, a bellows responsive to the temperature at a selected place, a spring, means connecting the bellows and spring so that the spring opposes the bellows, means having a portion outside of the casing manually movable to continuously alter the bias on the spring, a switch device for governing the cooling located adjacent the connecting means to be actuatable thereby in one direction; and a single element movable with the connecting means, located adjacent the switch device to actuate it only in the other direction, and actuated from the manually movable means to continuously alter the relation of said element to the connecting means so as to cause the operating differential to continuously increase as the spring is adjusted to a more highly compressed position.

13. In a controller, a closed thermostatic system including an expansible bellows, a spring opposing the movement of the bellows in one direction, a manually operable member for adjusting the tension of the spring to vary the range of the temperatures or pressures maintained by the controller, and means actuated from said member and adjustably mounted thereon for varying only one of the control points from the value determined by said spring as said member is operated to vary the range.

14. In an automatic refrigerator, a controller for maintaining the temperature or pressure at a selected place within predetermined limits, comprising a casing, temperature or pressure sensitive means responsive to changes in the temperature or pressure at the place under control, resilient means for predetermining the range of the limits of temperature or pressure maintained by the controller, a manually operable member for adjusting said resilient means to cause the controller to establish low, normal or defrosting temperature conditions in the refrigerator at will, a switch device associated with said sensitive means to be operated thereby when the limiting temperatures or pressures are reached, said switch being adapted to control the motor circuit of the refrigerator, and mechanism actuated simultaneously with the operation of said manual member and operating to cause increase of the closed period of the switch during the defrosting setting over the normal closed switch period for such range, and thereby cause operation of the refrigerator motor for sufficiently long periods during the defrosting to maintain food-preserving temperatures within the refrigerator.

FRANK J. BAST.